(12) United States Patent
Rautanen et al.

(10) Patent No.: US 6,353,605 B1
(45) Date of Patent: Mar. 5, 2002

(54) DATA TRANSMISSION IN A MOBILE NETWORK

(75) Inventors: Esko T. Rautanen; Hannu Vaitovirta; Juhani Jaamies, all of Espoo (FI)

(73) Assignee: Nokia Telecommunications Oy, Espoo (FI)

( * ) Notice: Subject to any disclaimer, the term of this patent is extended or adjusted under 35 U.S.C. 154(b) by 0 days.

(21) Appl. No.: 09/418,660

(22) Filed: Oct. 15, 1999

Related U.S. Application Data

(63) Continuation of application No. PCT/FI98/00318, filed on Apr. 9, 1998.

(30) Foreign Application Priority Data

Apr. 23, 1997 (FI) .................................................. 971724

(51) Int. Cl.[7] .......................... H04B 7/212; H04B 7/26; H04Q 11/04; H04Q 7/38
(52) U.S. Cl. ...................... 370/337; 370/347; 455/452; 455/509; 455/524
(58) Field of Search ................................ 370/328, 329, 370/336, 337, 338, 341, 345, 347; 455/422, 445, 450, 451, 452, 507, 509, 517, 523, 524

(56) References Cited

U.S. PATENT DOCUMENTS

| | | | |
|---|---|---|---|
| 5,506,837 A | 4/1996 | Söllner et al. ................. 370/31 |
| 5,590,133 A | * 12/1996 | Billstrom et al. ........... 370/349 |
| 5,648,962 A | 7/1997 | Pirinen ....................... 370/338 |
| 5,898,925 A | * 4/1999 | Honkasalo et al. ......... 455/437 |
| 5,991,627 A | * 11/1999 | Honkasalo et al. ......... 455/437 |

FOREIGN PATENT DOCUMENTS

| | | |
|---|---|---|
| EP | 544 975 | 12/1991 |
| WO | WO 94/00959 | 1/1994 |
| WO | WO 95/01015 | 1/1995 |
| WO | WO 97/24008 | 7/1997 |

* cited by examiner

*Primary Examiner*—Alpus H. Hsu
(74) *Attorney, Agent, or Firm*—Altera Law Group

(57) ABSTRACT

The invention relates to a method for implementing transmission in a mobile network in which base stations (BTS) communicate through a transmission network with a base station controller (BSC) and through a radio path with mobile stations (MS). In order that the transmission of the fixed part of the mobile network may be implemented in a simpler way than heretofore, a common transmission link (TL) is established between several base stations and their common base station controller, a combining network element (41, 42) being located at least at one point of the transmission link in which network element signals arriving from different base stations are combined of the base station to which the time slot basis for incorporation into the time slots of the frame structure used on the transmission link in such a way that the signal from the frame of the common transmission link (TL) for the use of the radio channels dynamically in such a way that any one of several different radio channels can use a specific channel on the transmission link.

10 Claims, 4 Drawing Sheets

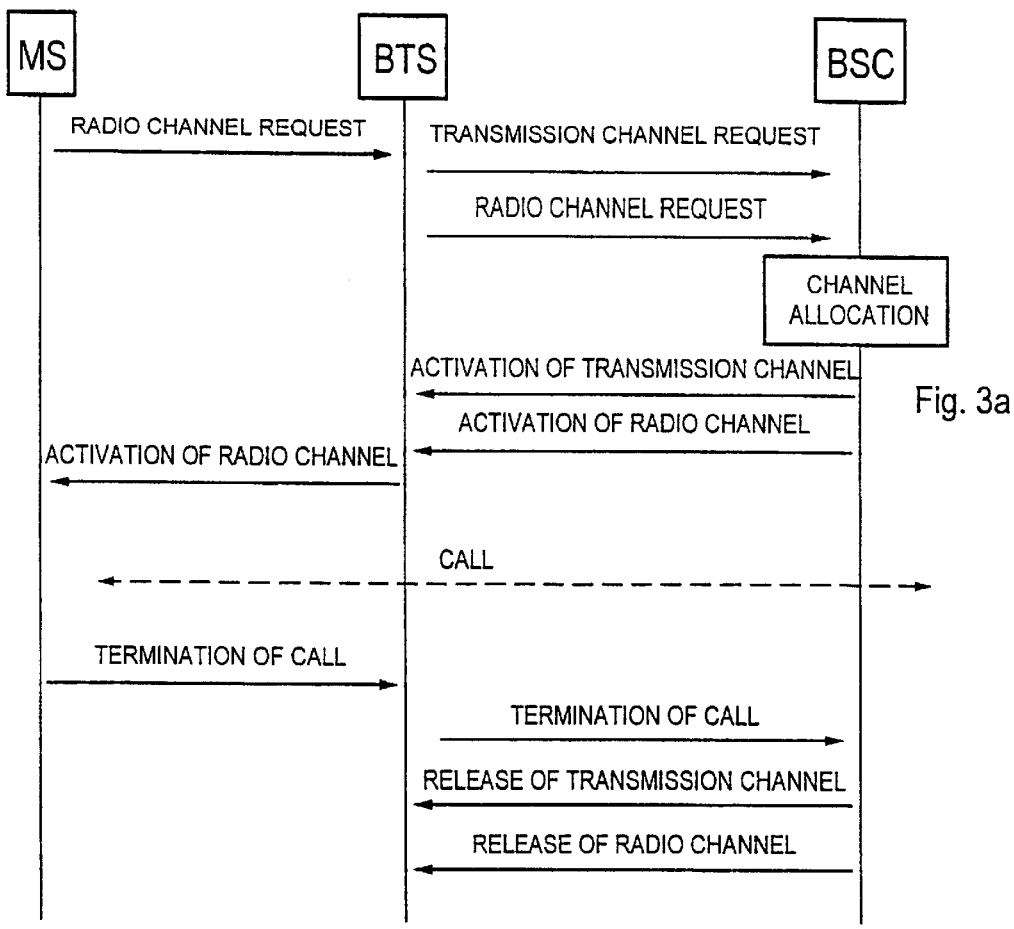
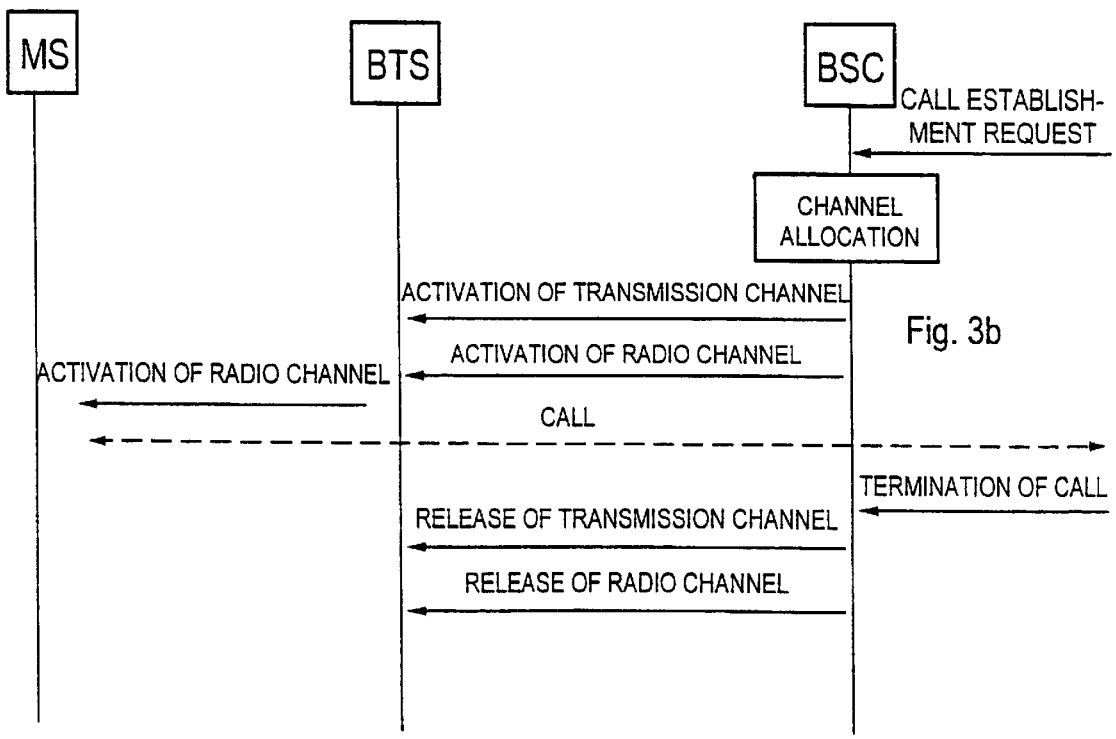

```
          AND
          ↓↓↓↓↓↓↓↓
BTS1:    1 1 1 1 1 1 1 1
BTS2:    1 0 0 1 0 1 1 1    Fig. 6
BTS3:    1 1 1 1 1 1 1 1
         ─────────────────
         1 0 0 1 0 1 1 1
```

DATA TRANSMISSION IN A MOBILE NETWORK

This application is a continuation of Ser. No. PCT/FI98/00318 filed Apr. 9, 1998.

FIELD OF THE INVENTION

The invention relates generally to mobile networks, and particularly to transmission to be implemented in their fixed network part. A fixed network in this context denotes that part of a mobile network which extends in the uplink direction from the base stations. Even though a fixed network is referred to in this context, it is to be noted that this fixed network or part thereof may be implemented with radio links, for example.

BACKGROUND OF THE INVENTION

To illustrate the typical architecture of a mobile network, FIG. 1 shows the structure of the known GSM mobile communications system (Global System for Mobile Communications), using abbreviations known from the context of the GSM system. The system comprises several open interfaces. The transactions relating to crossing of interfaces have been defined in the standards, in which context the operations to be carried out between the interfaces have also been largely defined. The network subsystem (NSS) of the GSM system comprises a mobile services switching centre (MSC) through whose system interface the mobile network is connected to other networks, such as a public switched telephone network (PSTN), an integrated services digital network (ISDN), other mobile networks (Public Land Mobile Networks PLMN), and packet switched public data networks (PSPDN) and circuit switched public data networks (CSPDN). The network subsystem is connected across the A interface to a base station subsystem (BSS) comprising base station controllers (BSC), each controlling the base transceiver stations (BTS) connected to them. The interface between the base station controller and the base stations connected thereto is the Abis interface. The base stations, on the other hand, are in radio communication with mobile stations across the radio interface.

The GSM network is adapted to other networks by means of the interworking function (IWF) of the mobile services switching centre. On the other hand, the mobile services switching centre is connected to the base station controllers with PCM trunk lines crossing the A interface. The tasks of the mobile services switching centre include call control, control of the base station system, handling of charging and statistical data, and signalling in the direction of the A interface and the system interface.

The tasks of the base station controller include, inter alia, the selection of the radio channel between the controller and a mobile station MS. For selecting the channel, the base station controller must have information on the radio channels and the interference levels on the idle channels. The base station controller performs mapping from the radio channel onto the PCM time slot of the link between the base station and the base station controller (i.e., onto a channel of the link). The establishment of the connection will be described in closer detail in the following.

The base station controller BSC schematically shown in FIG. 2 comprises trunk interfaces 21 and 22 through which the BSC is connected to the mobile services switching centre across the A interface on the one hand and to the base stations across the Abis interface on the other hand. The transcoder and rate adaptation unit TRAU forms part of the base station system and may be incorporated into the base station controller or the mobile services switching centre. For this reason, the unit is shown in broken line in FIG. 2. The transcoders convert speech from a digital format to another, for example convert the 64 kbit/s PCM signals arriving from the mobile services switching centre across the A interface into 13 kbit/s coded speech signals to be conveyed to the base station, and vice versa. Data rate adaptation is performed between the speed 64 kbit/s and the speed 3.6, 6, or 12 kbit/s. In a data application, the data does not pass through the transcoder.

The base station controller configures, allocates and controls the downlink circuits. It also controls the switching circuits of the base station via a PCM signalling link, thus enabling effective utilization of PCM time slots. In other words, a branching unit at a base station, which is controlled by the base station controller, connects the transmitter/receivers to PCM links. Said branching unit transfers the content of a PCM time slot to the transmitter (or forwards it to the other base stations if the base stations are chained) and adds the content of the receive time slot to the PCM time slot in the reverse transmission direction. Hence, the base station controller establishes and releases the connections for the mobile station. Multiplexing of the connections from the base stations to the PCM link(s) crossing the A interface is carried out in switching matrix 23, as is the reverse operation.

The layer 1 physical interface between the base station BTS and the base station controller BSC is in this example a 2048 kbit/s PCM line, i.e. comprises 32 64 kbit/s time slots (=2048 kbit/s). The base stations are fully under the control of the base station controller. The base stations mainly comprise transmitter/receivers providing a radio interface towards the mobile station. Four full-rate traffic channels arriving via the radio interface can be multi-plexed into one 64 kbit/s PCM channel between the base station controller and the base station, and hence the speed of one speech/data channel over this link is 16 kbit/s. Hence, one 64 kbit/s PCM link may transfer four speech/data connections.

FIG. 1 also shows the transfer rates used in the GSM system. The mobile station MS transmits speech data across the radio interface on the radio channel for example at the standard rate 13 kbit/s. The base station receives the data of the traffic channel and switches it to the 64 kbit/s time slot of the PCM link. Three other traffic channels of the same carrier are also located in the same time slot (i.e., channel), and hence the transfer rate per connection is 16 kbit/s, as stated previously. The transcoder/rate adaptation unit TRAU converts the encoded digital information to the rate 64 kbit/s, and at this rate the data is transferred to the mobile services switching centre. If the transcoder/rate adaptation unit is incorporated into the mobile services switching centre, maximum advantage is gained from compressed speech in data transmission.

In mobile networks of the above kind, the coverage area of the base stations has conventionally been wide, and thus there have been no great variations in the number of users roaming in the area of an individual base station, but the average traffic on the base station has been relatively uniform. In other words, the radio path has been concentrative (less channels in the radio path than users in the base station area). However, with the increase in the number of users, there has been a shift to using base stations having ever smaller coverage areas. With reduced cell size, the relative traffic fluctuations at the base station gain in magnitude. While the base station network continues to increase in density, it has become a problem how new base stations can be added to the network with maximum rapidity, flexibility and economy (with maximum utilization of the existing transmission capacity). This problem will be described in detail in the following in light of the current technology and the requirements to be set on the network.

Present-day mobile networks as a rule have fixed channels from the base stations to the base station controller, and such channels have been allocated in accordance with the overall radio path capacity of the base station. For example in TDMA-type (Time Division Multiple Access) radio systems, the time slot of the radio path is directly bound to the time slot of the transmission network (or part thereof. The transmission capacity of the fixed network is additionally needed for signalling between the base station and the base station controller and for network management.

The use of permanently allocated transmission channels (time slots) between the base station and the base station controller is economical for instance in cellular GSM and DCS systems in which one radio channel requires a capacity of 16 kbit/s in each transmission direction. On the other hand, the capacity required for example in the DECT system is normally 32 kbit/s for speech and often even more for data transmission. The required capacity may also be different in the different transmission directions. In that case, preparedness for worst-case capacity will waste a considerable amount of transmission capacity in normal use.

As for the fixed network, the utilization rate of transmission links has been enhanced by using cross-connects. These have enabled combination of 2048 kbit/s or 1544 kbit/s bit streams arriving from different base stations and arrangement of the 64 kbit/s time slots or parts thereof reserved by them. The cross-connects have a switching database of their own, which is defined in association with network installation and which can be changed if necessary for instance through operation and maintenance. At the same time when switching changes are made in a given cross-connect, the time slots reserved by the base stations and base station controllers must possibly also be changed and changes made in the other cross-connects as well. The maintenance of switching data in different equipments is thus a difficult task, particularly in complex networks.

When the coverage areas of base stations are reduced and their number increases, transmission networks have nevertheless simultaneously become ever more complex. On account of such a development, the maintenance of fixed network switching data in connection with mobile networks has become more difficult.

The mobile network operators should also be able to provide their customers with new services as simply and economically as possible. The novel mobile communications systems (such as the DECT) enable for example packet-switched transmission and also transmission performed at different rates in different directions. Implementing these functionalities economically and without wasting transmission capacity requires novel technical solutions.

The mobile network operator also needs to use the same transmission links for implementing different services. These transmission links are typically in accordance with the international standards and have the rate of either 2048 kbit/s (the E1 signal used in Europe) or 1544 kbit/s (the T1 signal used in the U.S.A.). Hence, it must be possible to allocate time slots from the same link for other uses than for the transmission of a specific mobile network.

As the transmission between the base stations and the base station controller already at present forms an essential part of the costs of the mobile network, it is obvious that with the increase in number and density of base stations, the significance of efficient and economical transmission solutions is emphasized even more. The rapid set-up of new base stations and the maintenance and flexibility of the transmission network have become key factors that are striven for in mobile networks.

The essential feature in the current network solutions is the need to carry out detailed network planning on time slot level. The requisite careful network planning on time slot level makes changes and additions to the network difficult and complex. Therefore, the present network solutions do not offer a suitable basis for achieving the aims set forth above.

SUMMARY OF THE INVENTION

It is an object of the invention to provide a solution wherewith transmission in the fixed part of a mobile network can be implemented in such a manner that the above aims are achieved more simply and cost-effectively than heretofore.

This object is achieved with the solutions defined in the independent claims.

The idea of the invention is to allocate the transmission capacity of the fixed part of the mobile network flexibly in accordance with the capacity needs in the radio path and to combine base stations on the transmission link between the base stations and the base station controller at least at one connection point where the digital signals from the base stations are logically combined in such a way that in each time slot or part thereof, only the signal to which said time slot or part thereof is allocated will get through.

With the solution of the invention, transmission in a fixed network is made concentrative and no intelligent cross-connects are needed in the network. The transmission network need not know in which time slot each base station is transmitting, but the time slot utilization information is located at the base stations and base station controller only. In practice, the intelligence can reside at the base station controller only, which grants the base stations permission to use time slots or parts thereof.

Since in this way transmission will be made transparent for the fixed network, transmission network planning on time slot level is eliminated. Neither do the cross-connects need any switching databases, and hence there is no need of operation and maintenance to change the switching.

Static control of transmission (in which a specific dedicated set of time slots in the frame of the common transmission link is allocated to each base station) already affords the above advantages. If, moreover, time slots (or parts thereof) are allocated fully dynamically (all transmission time slots in the transmission frame of the common transmission link are available to each base station), considerable savings in transmission capacity are achieved in many cases.

Since the concentration can be implemented in the transmission between the base station and the base station controller, considerable savings are achieved as the number of transmission links and switching ports at the base station controller can be smaller than heretofore.

On account of the above factors, new base stations can be taken into use and the network capacity can be increased more flexibly and cost-effectively than hitherto. Also introducing new services in the networks and transfer of other services using the transmission links of the mobile network is facilitated.

BRIEF DESCRIPTION OF THE DRAWINGS

In the following, the invention and its preferred embodiments will be described in detail with reference to FIGS.

3a–7b pertaining to the examples in accordance with the accompanying drawings, in which FIGS. 3a and 3b illustrate transmission of messages relating to connection establishment and channel allocation in the mobile network of the invention, FIG. 6 illustrates the operation of an adder in one time slot.

DETAILED DESCRIPTION OF THE INVENTION

Figure 1:
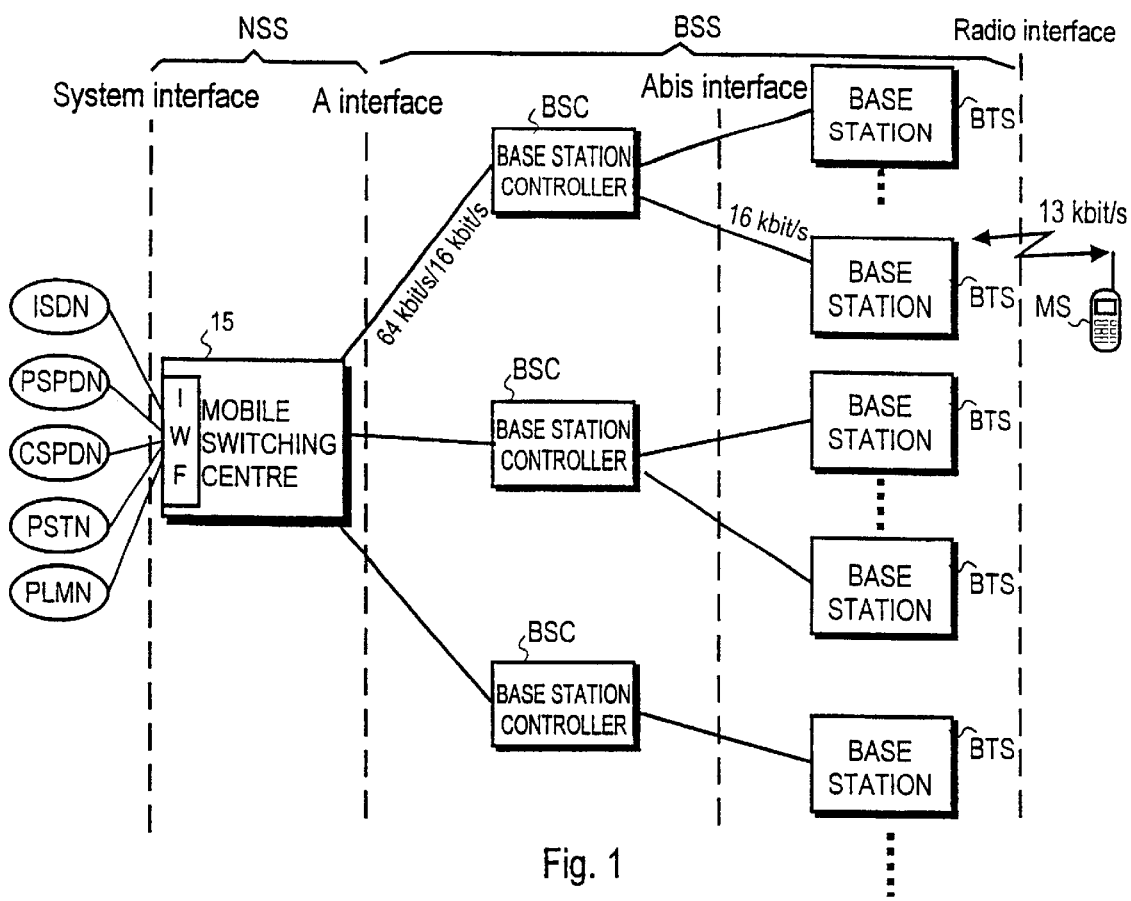
FIG. 1 shows the architecture of a GSM mobile network.
Figure 2:
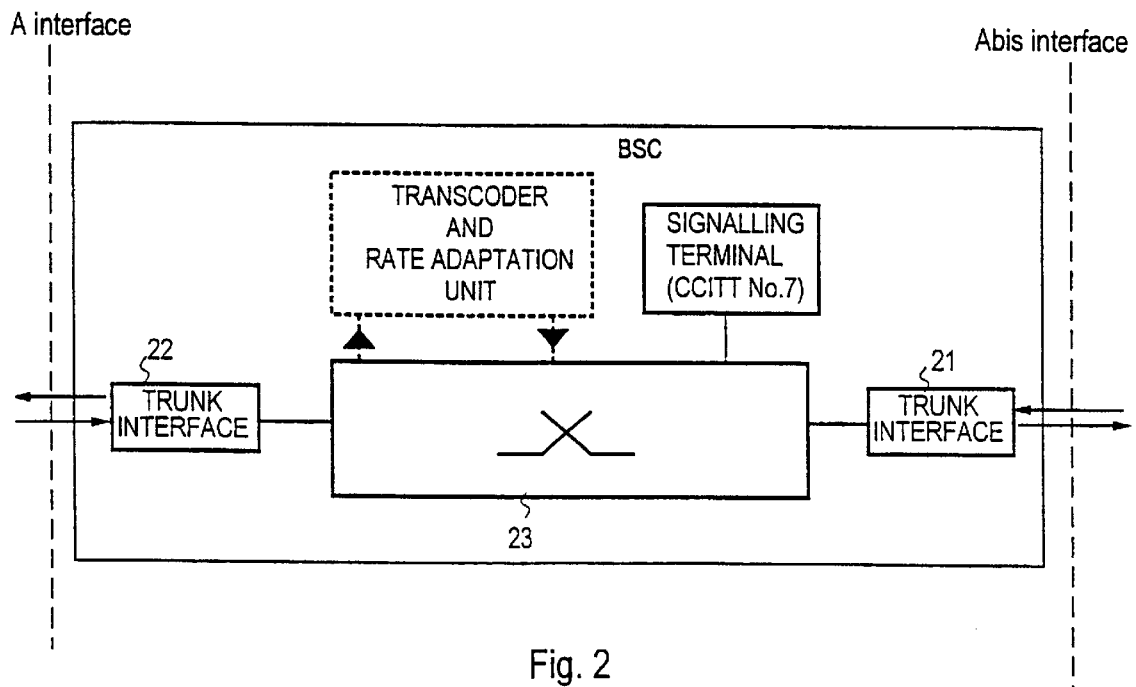
FIG. 2 is a schematic illustration of a base station controller.

The invention is based firstly on the fact that the transmission capacity of the fixed network is flexibly allocated in accordance with the capacity needs in the radio path. This means that no predetermined fixed-network channel from base station to base station controller has been allocated to any radio channel, but the different radio channels can use the same channel of the fixed network in turn as needed. This is realized in practice in such a way that when radio path capacity is allocated to a mobile station in the connection set-up phase, a transmission channel of the fixed network is simultaneously allocated to it. For example in a GSM/DCS network the base station controller performs the channel allocation.

FIG. 3a shows the message exchange between a mobile station MS, a base station BTS and a base station controller BSC when the mobile station acts as the calling party. In response to a radio channel request transmitted by the mobile station, the base station generates transmission and radio channel requests to the base station controller BSC. The base station controller allocates both a radio channel and a fixed network transmission channel from among the currently idle channels for the use of the mobile station and sends activation messages for said channels to the base station, which forwards the radio channel activation message further to the mobile station. When the mobile station terminates the call, it sends a quitting message to the base station which forwards it further to the base station controller. Thereafter the base station controller marks the channels as free and informs the base station of the freeing of the channels.

FIG. 3b illustrates a corresponding message exchange when the mobile station is the called party. The call establishment request comes from the network to the base station controller, which allocates both a fixed network transmission channel and a radio channel for the use of the connection and transmits channel activation messages to the base station which forwards the radio channel activation message further to the mobile station. When a call termination message arrives from the network, the base station controller marks the channels as free and informs the base station of the freeing of the channels that were used by the connection. Thereafter both the transmission channel and the radio channel are available to a new mobile station.

As is apparent from the above, the number of transmission channels on the transmission link between the base stations and their base station controllers need not be the same as the total number of radio channels. Moreover, the same transmission channel can be used by different base stations.

For radio channel allocation, known methods of channel allocation may be used, including dynamic channel allocation in which all radio channels share a common "channel pool" wherefrom they are taken into use as connection establishment requests arrive. In that situation, a radio channel can be allocated for the use of any base station, providing that the signal has a sufficiently low interference level. Since an idle radio channel is sought by using known allocation methods, the methods will not be described in detail in this context. When an idle radio channel has been found, a channel whose capacity corresponds to the capacity of the allocated radio channel is allocated therefore from among the idle transmission channels of the transmission network. The channel is searched either from among all idle transmission channels or from among those channels in the set of channels allocated previously for the use of said base station which are idle at the moment.

Figure 4:
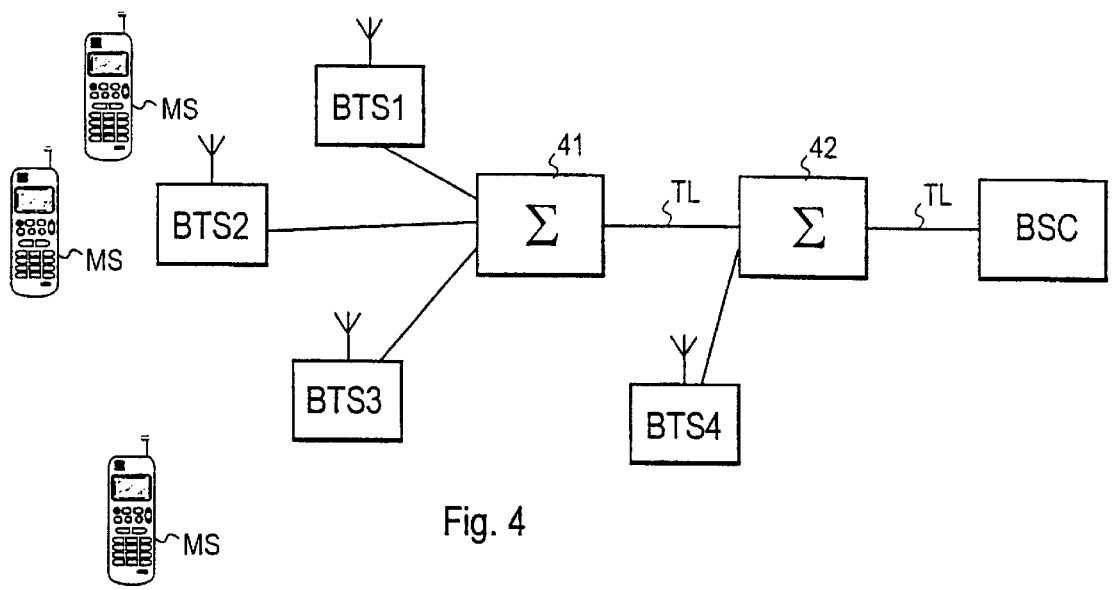
FIG. 4 shows the combination principle in accordance with the invention.

The network architecture in accordance with the invention is illustrated in FIG. 4, which depicts four base stations BTS1 ... BTS4 and their common base station controller BSC. A common transmission link TL is established between the base stations and their base station controller, and a combining element 41, 42 is located at least at one point of said transmission link, in which the digital signals arriving from the different base stations are combined to a common transmission link by using a logic operation. In the following, an example will be used in which the combining element is a digital adder comprising an AND gate and the common transmission link as well as the signals arriving from the base stations comprise a 2048 kbit/s PCM signal in accordance with the ITU-T recommendations G.703/.704 (the E1 signal stated above).

The combination of channels may take place at one point only or may comprise distributed chained combination, as in the example of FIG. 4 which has two digital adders (references 41 and 42) in chain.

Figure 5:
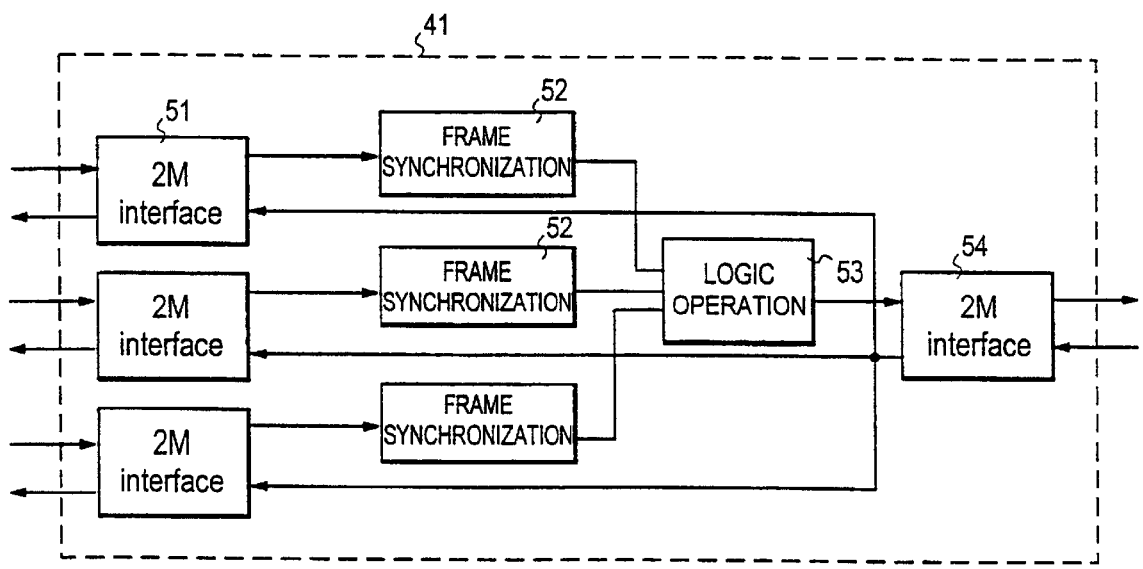
FIG. 5 shows a block diagram of the adder shown in FIG. 4.

A block diagram for the combining element is shown in FIG. 5, in which it has been presumed, as for element 41 in FIG. 4 that three base stations are connected thereto, each via a 2048 kbit/s interface of its own, and thus the base station end of the element has three parallel 2048 kbit/s interface circuits 51, one for each base station. Each interface circuit is a known circuit in accordance with the ITU-T recommendations G.703/G.704. The number of base stations connected to one combining element may naturally vary.

The operation of the element will first be described in the uplink direction (from base stations to base station controller).

Since the signals arriving from different base stations are in different phases, they must be frame synchronized in synchronization units 52. In the synchronization units, each base station signal is phased to the common frame structure in order that the base station signals may be transmitted over the common transmission link TL to the base station controller. When the base station signals have been phased, they are supplied to a common gate 53 carrying out a logic operation, in which a logic combination operation is performed at least on the traffic time slots of the tributaries bit for bit. In this exemplary case, the operation is a logic AND operation, and hence gate 53 is an AND gate.

The combined signal is supplied to an interface circuit 54 in accordance with recommendations G.703/G.704, which adapts the combined signal physically to the transmission link TL.

In the downlink direction, the 2048 kbit/s signal arriving at element 41 from the transmission link TL is distributed from input port 54 directly to all output interfaces 51.

FIG. 6 illustrates an addition operation performed by the AND gate 53 by depicting the signals sent by the base stations BTS1 . . . BTS3 connected to element 41 in a single time slot, e.g. in time slot 2 which in this exemplary case has been allocated for the use of base station BTS2. Since the AND operation is performed bit by bit and since all bits in the time slot are available, eight AND operations are performed in the time slot in this case, each of which is denoted with an arrow. Since the entire time slot is allocated to base station BTS2, the other base stations send in this time slot the bit pattern "11111111", which allows the transmission of the active base station (BTS2) to get through as such. The inactive base stations thus send the bit pattern "11111111" in all time slots.

Figure 7A:
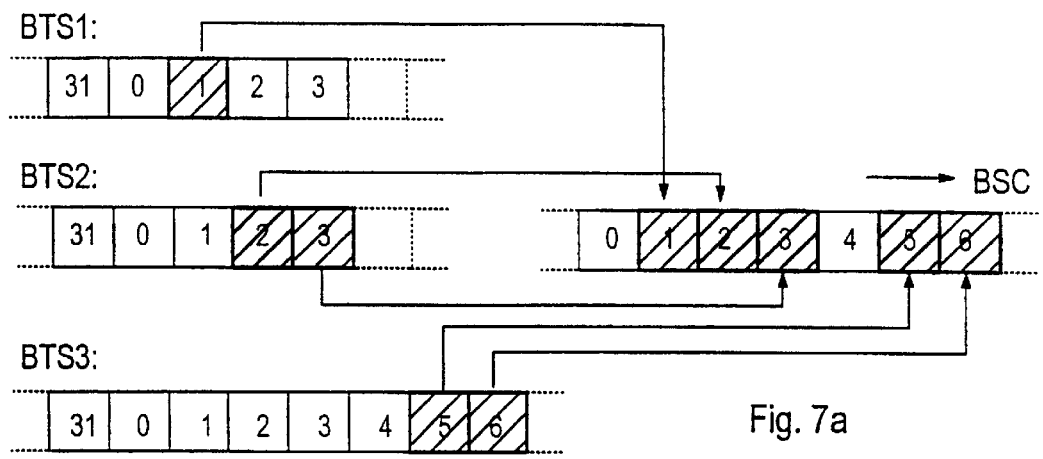
FIG. 7a shows the transmission principle in accordance with the invention from base station to base station controller.
Figure 7B:
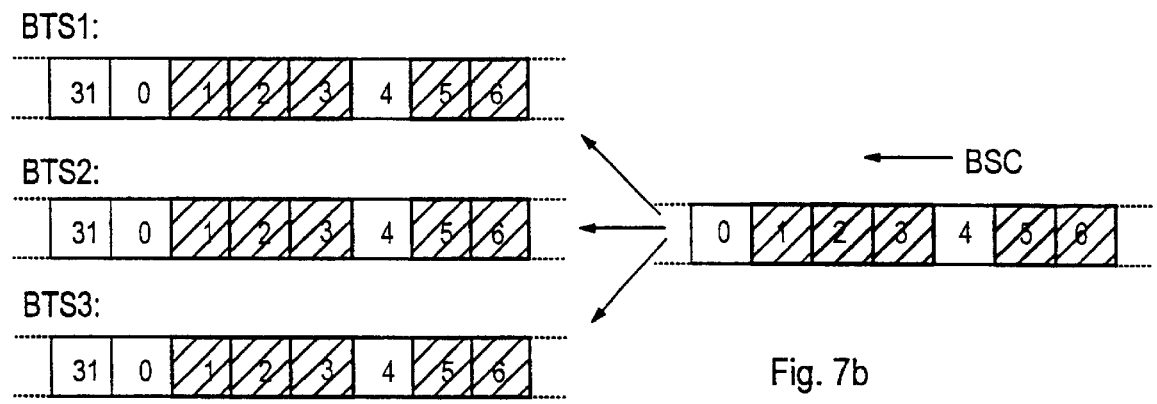
FIG. 7b shows the transmission principle in accordance with the invention from base station controller to base station.

FIGS. 7a and 7b illustrate transmission on frame level by depicting the uplink direction (frame base stations to base station controller) in FIG. 7a and the downlink direction (from base station controller to base stations) in FIG. 7b. The figure shows by hatching the time slots of the transmission frame that are allocated to each base station. As is apparent from the foregoing and is to be seen from FIG. 7a, the time slots allocated to the different base stations are "added" into the frame of the common transmission link in element 41. As is apparent from the foregoing and is to be seen from FIG. 7b, the time slots transmitted by the base station controller BSC are passed through the element as such to all base stations, and thus each base station picks from the frame the data of the time slots that have been allocated to said base station.

Transmission in one direction may be fully independent of that in the reverse direction, and for example the number of time slots allocated per connection may be different in the different transmission directions.

If specific time slots have been allocated for other transmission than that of the mobile network, these time slots can also be similarly combined by addition.

The allocation of (a) time slot(s) on link TL is performed independently of the time slots used in the radio path, yet in such a way that capacity is allocated from both the radio path and the link TL. The allocation of the time slots of the transmission link TL may be either static or dynamic or partly static and partly dynamic. Static allocation of time slots means that in the commissioning phase of the network, the transmission frame time slots that a particular base station is permitted to use are defined for that base station. The base station controller also has the same information. Dynamic allocation of time slots again means that the base stations and base station controller allocate time slots from all available time slots in accordance with their transmission needs.

In normal calls, a time slot or part thereof can be allocated in both transmission directions for the entire duration of the call. However, if the speech coding method allows no data being transmitted during breaks in speech, time slots can be allocated and freed more dynamically. The same principle can be followed for example in connection with packet-switched data services. The same channel can thus be allocated temporarily—for example during breaks—for the use of another connection, or the radio channel, fixed network channel or both channels allocated to the connection are changed during a given connection (e.g. call).

Even though the invention has been described in the above with reference to examples in accordance with the accompanying drawings, it is obvious that the invention is not restricted to them, but it can be modified within the scope of the inventive idea set forth in the appended claims. For example, the solution is not bound to mobile networks, but it has utility in any network of a similar type in which the network architecture and traffic are similar. (In other words, in networks in which there is no direct traffic between the terminal equipments but in which traffic from one terminal equipment to another travels first in the uplink direction and thereafter in the downlink direction and in which the traffic volume varies greatly and the amount of traffic in the different transmission directions may be dissimilar.)

The principle presented above may naturally be applied to part of a time slot instead of an entire time slot. Hence, the term time slot must be construed to mean a given length of a frame allocated for the use of a given connection (i.e., the number of successive bits required by one connection in a frame). As is apparent from the foregoing, the combination principle using a logic operation can be applied to all channels or to traffic channels only. Furthermore, the combining element employed may be an element realizing another function than the AND function, in which case respectively the inactive base stations transmit in all (traffic) time slots a bit pattern on account of which the base station signal to which said time slot has been allocated passes through the element unchanged. For example an OR gate (gate 53) may be used in the combining element, in which case respectively the inactive base stations transmit in a time slot or in part thereof a mere logical zero string. The bit pattern transmitted by the inactive base stations may in principle be any fixed bit pattern, as long as the function of the combining element is changed in accordance with the bit pattern. This can be implemented for example in such a way that when a zero in the bit pattern changes into a one, the function of the combining element changes from an OR function to an AND function. There may also be more than one basic logic operations used in the combining element.

What is claimed is:

1. A method for implementing transmission in a mobile network including
   base stations (BTS) which form radio cells,
   mobile stations (MS) located in the area of the radio cells and connected to the base stations through radio channels, and
   at least one base station controller (BSC) connected to the base stations via a transmission network, the method comprising the steps of
   carrying out transmission in the transmission network in time slots of successive frames,
   implementing transmission from a mobile station via a radio channel to a base station and from the base station via a transmission channel to the base station controller, said transmission channel being made up by time slots of successive frames or parts thereof,
   establishing a common transmission link (TL) between several base stations and their common base station controller,
   allocating channels from the frame of the common transmission link (TL) for the use of the radio channels dynamically in such a way that any one of several different radio channels can use a specific channel on the transmission link, characterized by locating a combining network element (41, 42) at least at one point of said transmission link, in said network element, merging signals arriving from different base stations on a time slot basis by (1) using the contents of time slots arriving substantially simultaneously as input information for a logic operation, and by (2) performing said logic operation so that the result of the operation corresponds to the content of the time slot of the signal of the base station to which the time slot in question is allocated, said result forming at each time the content of a time slot of the frame used on the transmission link.

2. A method as claimed in claim 1, characterized in that the allocation of both the transmission channel and the radio channel for the use of a transmission connection is performed in the base station controller (BSC).

3. A method as claimed in claim 1, characterized in that all time slots allocated to payload traffic in the transmission link frame are allocated for the use of all base stations connected to the transmission link.

4. A method as claimed in claim 1, characterized in that the signals sent by the base station controller to the base stations are transmitted to all base stations, each base station extracting from the frame the data of the time slots allocated to that base station.

5. A method as claimed in claim 1, characterized in that the signals arriving from the different base stations are combined at more than one points of the common transmission link.

6. A method as claimed in claim 1, characterized in that during the existence of a transmission connection between two terminals, at least one channel from the combination transmission channel/radio channel allocated to it is allocated for the use of another connection.

7. A method as claimed in claim 1, characterized in that the combining network element performs a logic AND operation on the signals arriving from the different base stations bit by bit, and in a time slot allocated to any given base station all other base stations connected to the network element send a logical one string.

8. A method as claimed in claim 1, characterized in that the combining network element performs a logic OR operation on the signals arriving from the different base stations bit by bit, and in a time slot allocated to any given base station all other base stations connected to the network element send a logical zero string.

9. A method as claimed in claim 1, characterized in that the logic operation performed in the combining network element is different in different bits of the time slot or in different time slots.

10. A mobile network, comprising base stations (BTS) which form radio cells, mobile stations (MS) located in the area of the radio cells and connected to the base stations through radio channels, and at least one base station controller (BSC) connected to the base stations via a transmission network, whereby a common transmission link (TL) is established between several base stations (BTS1 . . . BTS4) and their common base station controller (BSC), means (BSC) for allocating channels from the frame of the common transmission link (TL) for the use of the radio channels dynamically in such a way that any one of several different radio channels can use a specific channel on the transmission link, transmission being carried out in the transmission network in time slots of successive frames and a transmission connection being established from a mobile station via a radio channel to a base station and from the base station via a transmission channel to the base station controller, said transmission channel being made up by time slots of successive frames or parts thereof, characterized in that a combining network element (41, 42) is located at least at one point of said transmission link, in which network element signals arriving from different base stations are merged on a time slot basis by (1) using the contents of time slots arriving substantially simultaneously as input information for a logic operation, and by (2) performing said logic operation so that the result of the operation corresponds to the content of the time slot of the signal of the base station to which the time slot in question is allocated, said result forming at each time the content of a time slot of the frame used on the transmission link.

* * * * *